United States Patent [19]
Carr

[11] 3,825,860
[45] July 23, 1974

[54] SURFACE WAVE DELAY LINE WITH QUARTER-WAVE TAPS

[75] Inventor: Paul H. Carr, Bedford, Mass.

[73] Assignee: The United States of America as represented by the Secretary of the Air Force, Washington, D.C.

[22] Filed: Dec. 13, 1972

[21] Appl. No.: 314,638

[52] U.S. Cl. .................... 333/30 R, 310/9.8, 333/72
[51] Int. Cl. ........ H03h 9/26, H03h 9/30, H01v 7/00
[58] Field of Search ............. 333/72, 30 R; 310/8.0, 310/8.2, 9.8

[56] References Cited

UNITED STATES PATENTS

| | | | |
|---|---|---|---|
| 3,401,360 | 9/1968 | Schulz-Du Bois | 310/9.8 X |
| 3,675,054 | 7/1972 | Jones et al. | 333/72 X |
| 3,723,919 | 3/1973 | Adler | 333/72 |
| 3,727,155 | 4/1973 | De Vries | 333/30 R X |

OTHER PUBLICATIONS

Adkins et al.–"Surface Acoustic Waves–Device Applications and Signal Routing Techniques for VHF and UHF" Microwave Journal, March 1970; pages 87–90.

*Primary Examiner*—James W. Lawrence
*Assistant Examiner*—Marvin Nussbaum
*Attorney, Agent, or Firm*—Harry A. Herbert, Jr.; William Stepanishen

[57] ABSTRACT

A surface wave delay line apparatus utilizing quarter-wave taps in a multiply tapped Li $NbO_3$ delay line to reduce reflections.

3 Claims, 6 Drawing Figures

SURFACE WAVE DELAY LINE WITH QUARTER-WAVE TAPS

BACKGROUND OF THE INVENTION

The present invention relates broadly to a surface wave delay line apparatus and in particular to a Li $NbO_3$ delay line with multiple quarter wave taps.

In the prior art, the conventional acoustic surface wave transducer devices have electrodes which are spaced one half wavelength apart. The lines of the conventional surface wave transducer are spaced one half wavelength apart in order to optimize efficiency of operation within the device itself. However, the utilization of the one half wavelength spacing does provide optimum conditions for reflections which in many applications are undesirable. In low insertion loss acoustic surface wave signal processing devices having a large time-bandwidth product, the reduction of second order effects which are due to reflections is critical. The spurious responses due to reflections occuring in large time-bandwidth product acoustic surface wave devices disrupts the desired circuit operation. The present invention provides an acoustical surface wave device with novel spacing to minimize the spurious responses which are due to reflections occurring in large time-bandwidth product devices.

SUMMARY

The present invention utilizes a large time-bandwidth product, low insertion loss acoustic surface wave transducer apparatus having substantially reduced second order effects due to reflections within the transducer are minimized by altering the conventional transducer spacings to one quarter and three quarter wavelengths.

It is one object of the invention, therefore, to provide an improved surface wave delay line apparatus having minimal second order effects due to reflections.

It is another object of the invention to provide an improved surfact wave delay line apparatus having an optimum spacing between the lines of the transducer to minimize the effects of spurious responses.

It is still another object of the invention to provide an improved surface wave delay line apparatus having electrodes which are spaced one quarter and three quarter wavelengths apart.

These and other advantages, objects and features of the invention will become more apparent from the following detailed description when taken in conjunction with the illustrative embodiment in the accompanying drawings.

DESCRIPTION OF THE PREFERRED EMBODIMENT

Figure 1:
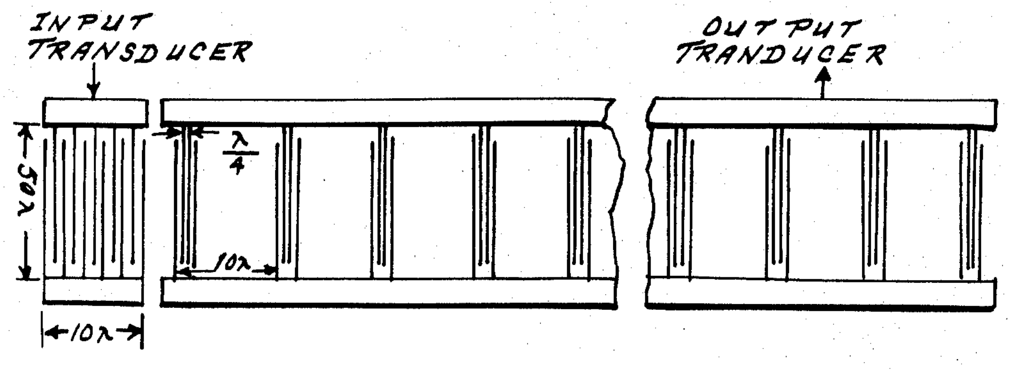
FIG. 1 PRIOR ART
FIG. 1 is a schematic diagram of an acoustical surface wave device arranged in a 50-tap sin *f/f* filter configuration.

Referring now to FIG. 1, there is shown a large time-bandwidth product, low insertion loss acoustic surface wave apparatus having electrode taps with a spacing of one-quarter wavelength. In the actual construction of large time-bandwidth product, low insertion-loss acoustic surface wave signal processing devices, the reduction of second order effects such as refleactions between the lines of the interdigital transducer is critical. The reduction of reflections in the 50-tap sin *f/f* filter configuration, such as is shown in FIG. 1, may be accomplished by using interdigital taps which are spaced by one quarter wavelength between centers rather than the customary half-wavelength. The reflections and back voltages present in a multiply tapped $LiNbO_3$ delay line have been measured. It was found that reflections from taps spaced by one-quarter wavelength were 5 to 15 dB less than those spaced by the customary half-wavelength. The motivation for using the quarter wave spacing is the fact that the reflection from unconnected lines vanishes for a continuous wave, while the reflection from lines spaced by one-half wavelength is a maximum. It has been shown that reduced second order effects under the taps of a binary decoder may be achieved by decoupling them from the piezoelectric lithium niobate substrate with a silicon monoxide thin film. The present new method of using quarter wave taps has the advantages of being monolithic and eliminating the dispersion of the thin-film but does require higher photolithographic resolution.

Experiments were performed with a 800 A aluminum film (over a chromeflash) deposited as shown in FIG. 1 on the Y-cut, Z-propagating orientation of lithium niobate. Time domain measurements were made by exciting the input interdigital transducer of FIG. 1 with a 3 nsec wide pulse of about 50 V. This resulted in the generation of a 10 cycle, 74 nsec wide surface wave pulse. The reflections from the two 0.19-wavelength-wide lines separated by one-half wavelength, and terminated by both an external short and an internal (two wires across the "bus bar") short were 31.5 dB below the initial output. The reflections from the similarly terminated 0.07-wavelength-wide lines separated by one quarter wavelength were 5 dB below the reflections from the half wavelength taps. When the taps were terminated by a 50 ohm load, the back voltage, which was generated during the 3.8 μsec that it took the initial pulse to traverse the 50 taps, appeared in the spaces and interfered with the reflections. Larger reflections and back voltages were observed for the half-wave taps.

Measurements were made on a second sample of YZ lithium niobate with similar film thickness. However, due to slight variations in exposing the photolithographic master and/or in etching times, the line-widths of both transducers were narrower than those of the first sample. The reflections from the two 0.12 wavelength wide lines spaced by one-half wave-lengths and terminated in an external short were 29 dB below the initial output. The reflections from the similarly terminated 0.035 wavelength wide lines spaced by one quarter wavelength were 15 dB below the reflections from the half-wavelength taps. Thus, the smaller linewidth of the quarter-wave taps on this sample produces a much smaller reflection than on the first sample.

Figure 2:
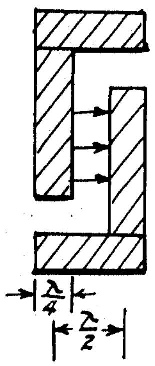
FIG. 2 is a vertical view of a conventional prior art surface wave tap transducer.
Figure 3:
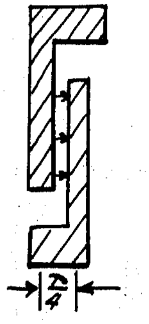
FIG. 3 is a vertical view of a surface wave transducer used as a quarter wave tap in accordance with this invention.

There is shown in FIG. 2 a vertical view of a conventional transducer device having half wave spacing and in FIG. 3 there is shown a transducer device of similar construction with the exception that its taps are spaced at a quarter wavelength in accordance with the teachings of the present invention. In the ideal continuous wave case, the reflections from the quarter wave tap transducer device would be eliminated as compared to a similar half wave tap device. However, in measurements of volume waves which were generated in an actual experimental situation, the reflection from the quarter wave taps was 4 db below the half wave case. Volume waves were partially suppressed by the longer transducer of FIG. 4. The reflections from 0.07-wavelengthwide lines separated as in FIG. 4 by one quarter wavelength were 5 dB below the reflections from the half wavelength taps. The reflections from 0.035 wavelength wide lines spaced by one quarter wavelength or in FIG. 4 were 15 dB below the reflections from the half-wavelength taps of FIG. 2.

Figure 5:
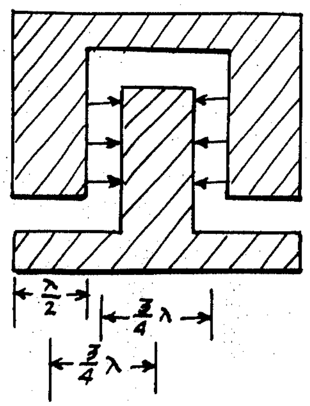
FIG. 5 is a vertical view of a transducer having electrodes which are spaced by three quarter wavelengths.

There is shown in FIG. 5 a vertical view of a transducer having electrodes spaced by three quarter wavelengths. This configuration may be further simplified by showing two electrode lines as shown in FIGS. 2 and 3. The halfwave linewidth is chosen to suppress reflections. If there were no volume wave interaction, one half-wavelength wide line should have no reflections. By cascading a number of such lines which are spaced three quarter wavelengths between centers, the volume wave is suppressed. The three-quarter wavelength transducer tap has the important technical advantage of being easier to fabricate than the quarter-wave tap of FIGS. 3 and 4.

Figure 4:
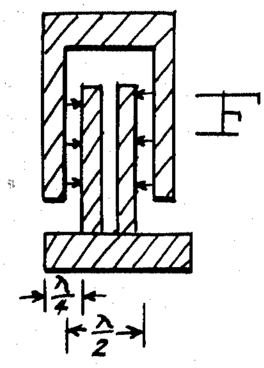
FIG. 4 is a vertical view of 4 electrode transducer with electrodes spaced by one quarter wavelength, having two active sections separated by one-half wavelength.
Figure 6:
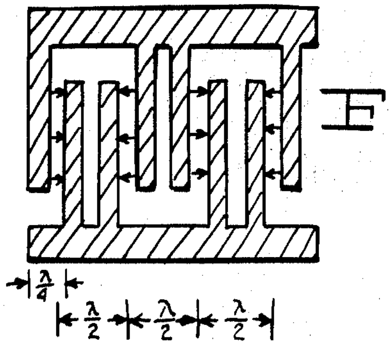
FIG. 6 is a vertical view illustrating cascading two sections of FIG. 4 for increased efficiency.

The basic quarter wave section of FIG. 4 is shown cascaded in FIG. 6 to provide an acoustic surface wave having an electric field which adds in phase. The cascading of the quarter wave sections which are shown in FIG. 3 and the three-quarter wavelength sections which are shown in FIG. 5, the volume waves are more nearly suppressed but the increase in efficiency is not as great as in cascading the configuration shown in FIG. 4. This is because the active sections have an electric field spaced one quarter wavelength apart rather than one half-wavelength as shown in new FIG. 6. This means for the one quarter and three quarter wavelength cases that the active sections add in quadriture. Whenever the number of active sections is four or a multiple of four, there will be complete cancellation. For broadband transducers, this may be advantageous, as the bandwidth is limited by the net number of active sections, which will never be more than two. Thus, a large number of quarter-wave cascaded sections will have a large capacitance, which may sometimes be an advantage for electrical matching.

Although the invention has been described with reference to a particular embodiment, it will be understood to those skilled in the art that the invention is capable of a variety of alternative embodiments within the spirit and scope of the appended claims.

I claim:

1. An acoustical surface wave apparatus comprising in combination:

a piezoelectric substrate and an interdigital transducer deposited upon said piezoelectric substrate, said interdigital transducer having an input and an output transducer, said input transducer receiving an input signal, said input transducer having an overall length of 10λ, said output transducer providing an output signal, said output transducer comprising a plurality of interleaved metal electrode pairs, said plurality of interleaved metal electrode pairs having a 10λ spacing between the leading edges of said interleaved metal electrode pairs, said interleaved metal electrode pairs having a one quarter wavelength spacing center to center between all the metal electrodes of said interleaved metal electrode pairs.

2. An acoustical surface wave apparatus as described in claim 1 wherein said plurality of interleaved metal electrode pairs comprise 50 electrode pairs alternatively connected to a pair of side rails.

3. An acoustical surface wave apparatus as described in claim 1 wherein said interleaved metal electrode pairs comprise a first mated set of electrodes spaced one quarter wavelength apart, said mated set of electrodes being connected to a first side rail, and a second mated set of electrodes enclosing said first mated set of electrodes, said second mated set of electrodes being spaced one quarter wavelength from said first mated set of electrodes, said second mated set of electrodes being connected to a second side rail.

* * * * *